US011104326B1

(12) United States Patent
Inoue et al.

(10) Patent No.: US 11,104,326 B1
(45) Date of Patent: Aug. 31, 2021

(54) CONTROL DEVICE OF VEHICLE

(71) Applicant: HONDA MOTOR CO., LTD., Tokyo (JP)

(72) Inventors: Mamiko Inoue, Saitama (JP); Kentaro Shiraki, Saitama (JP); Tatsuya Ishikawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/185,377

(22) Filed: Feb. 25, 2021

(30) Foreign Application Priority Data

Feb. 28, 2020 (JP) .............................. JP2020-033437

(51) Int. Cl.
*B60W 20/40* (2016.01)
*B60W 20/20* (2016.01)

(52) U.S. Cl.
CPC ............ *B60W 20/40* (2013.01); *B60W 20/20* (2013.01); *B60W 2520/10* (2013.01); *B60W 2710/021* (2013.01); *B60W 2710/0644* (2013.01); *B60W 2710/081* (2013.01)

(58) Field of Classification Search
CPC .. B60W 20/20; B60W 20/40; B60W 2520/10; B60W 2710/021; B60W 2710/0644; B60W 2710/081
See application file for complete search history.

(56) References Cited

U.S. PATENT DOCUMENTS

| | | | | |
|---|---|---|---|---|
| 8,239,121 B2* | 8/2012 | Hattori | ...................... | B60L 7/14 701/105 |
| 8,271,156 B2* | 9/2012 | Jinno | ....................... | B60K 6/44 701/22 |
| 9,073,427 B2* | 7/2015 | Ueda | ..................... | B60W 20/20 |
| 9,605,605 B2* | 3/2017 | Ideshio | ........... | B60W 30/18054 |
| 9,840,247 B2* | 12/2017 | Sato | ....................... | B60W 20/15 |
| 9,951,709 B2* | 4/2018 | Murata | ................. | F02D 41/042 |
| 2010/0131180 A1* | 5/2010 | Hattori | ................ | B60L 15/2009 701/105 |
| 2014/0194246 A1* | 7/2014 | Ueda | ...................... | B60K 6/442 477/5 |
| 2016/0176391 A1* | 6/2016 | Sato | ...................... | B60W 10/08 701/22 |
| 2020/0122712 A1 | 4/2020 | Miki et al. | | |

FOREIGN PATENT DOCUMENTS

WO    WO 2019/003443 A1    1/2019

* cited by examiner

*Primary Examiner* — Tinh Dang
(74) *Attorney, Agent, or Firm* — Paratus Law Group, PLLC

(57) ABSTRACT

An internal combustion engine control unit is configured to, in a case where a traveling mode setting unit sets a first traveling mode, increase a rotational speed of an internal combustion engine in accordance with an increase in a speed of a vehicle, and when a rotational speed reaches a predetermined first rotational speed, decrease the rotational speed to a second rotational speed lower than the first rotational speed. In a case where the internal combustion engine control unit decreases the rotational speed of the internal combustion engine to the second rotational speed, the traveling mode setting unit forbids a transition to the second traveling mode for a predetermined period from when the rotational speed is decreased to the second rotational speed.

2 Claims, 8 Drawing Sheets

FIG. 2

| TRAVELING MODE | FIRST CLUTCH | SECOND CLUTCH | ENGINE | MOTOR | GENERATOR |
|---|---|---|---|---|---|
| EV TRAVELING MODE | DISENGAGE | DISENGAGE | STOP POWER OUTPUT | DRIVEN BY BATTERY | STOP POWER GENERATION |
| HYBRID TRAVELING MODE | DISENGAGE | DISENGAGE | OUTPUT POWER | DRIVEN BY GENERATOR | GENERATE POWER |
| LOW-SPEED SIDE ENGINE TRAVELING MODE | ENGAGE | DISENGAGE | OUTPUT POWER | OUTPUT POWER IF NECESSARY | STOP POWER GENERATION |
| HIGH-SPEED SIDE ENGINE TRAVELING MODE | DISENGAGE | ENGAGE | OUTPUT POWER | OUTPUT POWER IF NECESSARY | STOP POWER GENERATION |

CONTROL DEVICE OF VEHICLE

CROSS-REFERENCE TO RELATED APPLICATIONS

This application is based on and claims priority under 35 USC 119 from Japanese Patent Application No. 2020-033437 filed on Feb. 28, 2020.

TECHNICAL FIELD

The present disclosure relates to a control device of a vehicle.

BACKGROUND ART

In recent years, a hybrid electrical vehicle has a plurality of traveling modes including a hybrid traveling mode, in which a generator generates electric power based on power of an engine in a state where a clutch is disengaged and an electric motor outputs power at least based on the electric power supplied by the generator to drive a driving wheel, and an engine traveling mode in which the driving wheel is driven by at least power output by the engine in a state where the clutch is engaged (for example, see WO-A-2019-003443). WO-A-2019-003443 also discloses a technique of increasing or decreasing a rotational speed of the engine between a lower limit rotational speed and an upper limit rotational speed in accordance with a change in a rotational speed (that is, vehicle speed) of the driving wheel in a series traveling mode.

SUMMARY OF INVENTION

However, in WO-A-2019-003443 described above, there is a possibility that the engine rotational speed is decreased a plurality of times unintentionally by a driver within a short period of time with a transition from a series traveling mode to the engine traveling mode. Further, when a decrease in the engine rotational speed that is not intended by the driver occurs a plurality of times within a short period of time, the driver may feel uncomfortable or may misunderstand a failure of the engine.

The present disclosure provides a control device of a vehicle capable of preventing a decrease in an engine rotational speed that is not intended by a driver from being generated a plurality of times within a short period of time.

According to the present disclosure, there is a control device of a vehicle capable of traveling according to a plurality of traveling modes, the vehicle including: an internal combustion engine; and a generator configured to generate electric power by power of the internal combustion engine; an electric motor configured to output power in accordance with the supplied electric power; a driving wheel driven by power output from at least one of the internal combustion engine and the electric motor; and a disconnection/connection part configured to disconnect/connect a power transmission path between the internal combustion engine and the driving wheel, the plurality of traveling modes including: a first traveling mode in which the disconnection/connection part is disconnected, and the driving wheel is driven by the power output from the electric motor in accordance with at least the electric power supplied from the generator to cause the vehicle to travel; and a second traveling mode in which the disconnection/connection part is connected, and the driving wheel is driven by at least the power of the internal combustion engine to cause the vehicle to travel, the control device including: a traveling mode setting unit configured to set the traveling mode of any one of the plurality of traveling modes; and an internal combustion engine control unit configured to control the internal combustion engine, in which the internal combustion engine control unit is configured to, in a case where the traveling mode setting unit sets the first traveling mode, increase a rotational speed of the internal combustion engine in accordance with an increase in a speed of the vehicle, and when the rotational speed reaches a predetermined first rotational speed, decrease the rotational speed to a second rotational speed lower than the first rotational speed, and in which in a case where the internal combustion engine control unit decreases the rotational speed of the internal combustion engine to the second rotational speed, the traveling mode setting unit forbids a transition to the second traveling mode for a predetermined period from when the rotational speed is decreased to the second rotational speed.

According to the present disclosure, in the first traveling mode in which the vehicle travels by the power output by the electric motor in accordance with the electric power supplied from the generator generated by the power of the internal combustion engine, the rotational speed of the internal combustion engine is increased in accordance with the increase in a speed of the vehicle, and when the rotational speed reaches the predetermined first rotational speed, the rotational speed is decreased to the second rotational speed lower than the first rotational speed.

Further, in a case where the rotational speed of the internal combustion engine is decreased to the second rotational speed in the first traveling mode, the transition to the second traveling mode is forbidden for the predetermined period from when the rotational speed is decreased to the second rotational speed. As a result, it is possible to prevent a decrease in the engine rotational speed that is not intended by the driver from being generated a plurality of times within a short period of time.

BRIEF DESCRIPTION OF DRAWINGS

FIG. 2 is a diagram illustrating the contents of each traveling mode.

DESCRIPTION OF EMBODIMENTS

Hereinafter, an embodiment of a control device of a vehicle according to the present disclosure will be described in detail with reference to the drawings.

Figure 1:
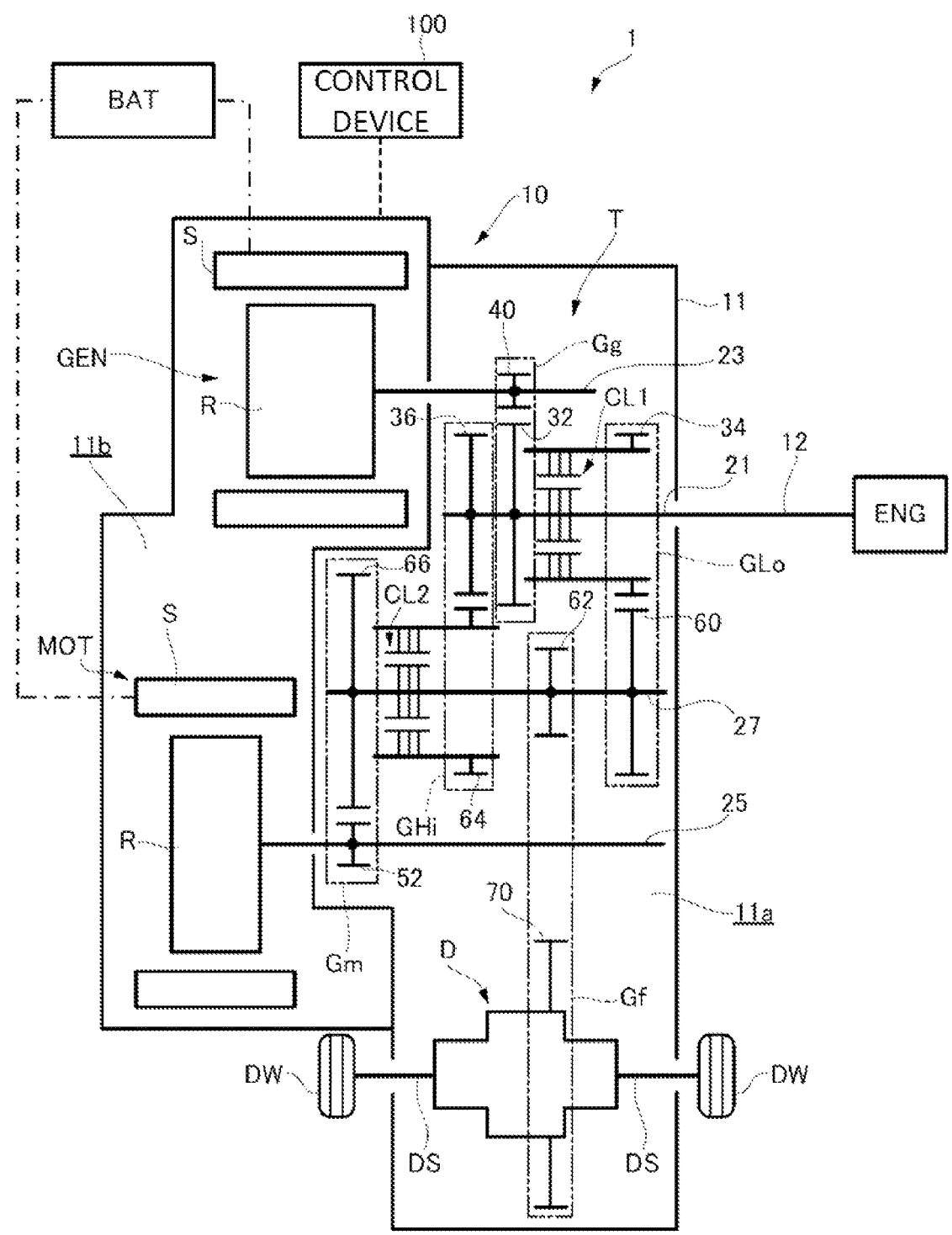
FIG. 1 is a diagram illustrating a schematic configuration of a vehicle including a control device of a vehicle according to an embodiment of the present disclosure.

First, a vehicle including the control device of a vehicle according to the present embodiment will be described with reference to FIG. 1. As illustrated in FIG. 1, a vehicle 1 of the present embodiment includes a driving device 10 that outputs a driving force of the vehicle 1, and a control device 100 that controls the entire vehicle 1 including the driving device 10.

[Driving Device]

As illustrated in FIG. 1, the driving device 10 includes an engine ENG, a generator GEN, a motor MOT, a transmission T, and a case 11 that accommodates the generator GEN, the motor MOT, and the transmission T. The motor MOT and the generator GEN are connected to a battery BAT included in the vehicle 1, which enables electric power supply from the battery BAT and energy regeneration to the battery BAT.

[Transmission]

The case 11 is provided with a transmission accommodating chamber 11a for accommodating the transmission T and a motor accommodating chamber 11b for accommodating the motor MOT and the generator GEN from the engine ENG side along an axial direction.

The transmission accommodating chamber 11a accommodates an input shaft 21, a generator shaft 23, a motor shaft 25, a counter shaft 27, and a differential mechanism D arranged in parallel to each other.

The input shaft 21 is arranged coaxially with and adjacently to a crankshaft 12 of the engine ENG. A driving force of the crankshaft 12 is transmitted to the input shaft 21 via a damper (not illustrated). The input shaft 21 is provided with a generator drive gear 32 constituting a generator gear train Gg.

The input shaft 21 is provided with a low-speed side drive gear 34 constituting a low-speed side engine gear train GLo via a first clutch CL1 on the engine side with respect to the generator drive gear 32, and a high-speed side drive gear 36 constituting a high-speed side engine gear train GHi on a side opposite to the engine side (hereinafter, referred to as a motor side). The first clutch CL1 is a hydraulic clutch for detachably connecting the input shaft 21 and the low-speed side drive gear 34, and is a so-called multi-plate friction type clutch.

The generator shaft 23 is provided with a generator driven gear 40 that meshes with the generator drive gear 32. The generator drive gear 32 of the input shaft 21 and the generator driven gear 40 of the generator shaft 23 constitute a generator gear train Gg for transmitting a rotation of the input shaft 21 to the generator shaft 23. The generator GEN is arranged on the motor side of the generator shaft 23. The generator GEN includes a rotor R fixed to the generator shaft 23 and a stator S fixed to the case 11 and arranged to face an outer diameter side of the rotor R.

When the rotation of the input shaft 21 is transmitted to the generator shaft 23 via the generator gear train Gg, the rotor R of the generator GEN rotates due to the rotation of the generator shaft 23. Accordingly, when the engine ENG is driven, power of the engine ENG input from the input shaft 21 can be converted into electric power by the generator GEN.

The motor shaft 25 is provided with a motor drive gear 52 constituting a motor gear train Gm. The motor MOT is arranged on the motor shaft 25 closer to the motor side than the motor drive gear 52. The motor MOT includes a rotor R fixed to the motor shaft 25 and a stator S fixed to the case 11 and arranged to face an outer diameter side of the rotor R.

The counter shaft 27 is provided with, in order from the engine side a low-speed side driven gear 60 meshing with the low-speed side drive gear 34, an output gear 62 meshing with a ring gear 70 of the differential mechanism D, a high-speed side driven gear 64 meshing with the high-speed side drive gear 36 of the input shaft 21 via a second clutch CL2, and a motor driven gear 66 meshing with the motor drive gear 52 of the motor shaft 25. The second clutch CL2 is a hydraulic clutch for detachably connecting the counter shaft 27 and the high-speed side driven gear 64, and is a so-called multi-plate friction type clutch.

The low-speed side drive gear 34 of the input shaft 21 and the low-speed side driven gear 60 of the counter shaft 27 constitute a low-speed side engine gear train GLo for transmitting the rotation of the input shaft 21 to the counter shaft 27. The high-speed side drive gear 36 of the input shaft 21 and the high-speed side driven gear 64 of the counter shaft 27 constitute a high-speed side engine gear train GHi for transmitting the rotation of the input shaft 21 to the counter shaft 27. Here, the low-speed side engine gear train GLo including the low-speed side drive gear 34 and the low-speed side driven gear 60 has a higher reduction ratio than the high-speed side engine gear train GHi including the high-speed side drive gear 36 and the high-speed side driven gear 64.

Therefore, when the first clutch CL1 is engaged and the second clutch CL2 is disengaged at the time of driving the engine ENG, the driving force of the engine ENG is transmitted to the counter shaft 27 via the low-speed side engine gear train GLo at a high reduction ratio. Meanwhile, when the first clutch CL1 is disengaged and the second clutch CL2 is engaged at the time of driving the engine ENG, the driving force of the engine ENG is transmitted to the counter shaft 27 via the high-speed side engine gear train GHi at a low reduction ratio. Note that the first clutch CL1 and the second clutch CL2 are not engaged at the same time.

The motor drive gear 52 of the motor shaft 25 and the motor driven gear 66 of the counter shaft 27 constitute the motor gear train Gm for transmitting the rotation of the motor shaft 25 to the counter shaft 27. When the rotor R of the motor MOT is rotated, the rotation of the motor shaft 25 is transmitted to the counter shaft 27 via the motor gear train Gm. Accordingly, when the motor MOT is driven, the driving force of the motor MOT is transmitted to the counter shaft 27 via the motor gear train Gm.

The output gear 62 of the counter shaft 27 and the ring gear 70 of the differential mechanism D constitute a final gear train Gf for transmitting a rotation of the counter shaft 27 to the differential mechanism D. Therefore, the driving force of the motor MOT input to the counter shaft 27 via the motor gear train Gm, the driving force of the engine ENG input to the counter shaft 27 via the low-speed side engine gear train GLo, and the driving force of the engine ENG input to the counter shaft 27 via the high-speed side engine gear train GHi are transmitted to the differential mechanism D via the final gear train Gf and transmitted from the differential mechanism D to an axle DS. As a result, a driving force for the vehicle 1 to travel is output via a pair of driving wheels DW provided at both ends of the axle DS.

The driving device 10 configured as described above has a power transmission path for transmitting the driving force of the motor MOT to the axle DS (that is, the driving wheels DW), a low-speed side power transmission path for transmitting the driving force of the engine ENG to the axle DS, and a high-speed side power transmission path for transmitting the driving force of the engine ENG to the axle DS. Thus, as will be described later, the vehicle 1 equipped with the driving device 10 can take a plurality of traveling modes such as an EV traveling mode or a hybrid traveling mode in which the vehicle travels on power output from the motor MOT, and a low-speed side engine traveling mode or a high-speed side engine traveling mode in which the vehicle travels on power output from the engine ENG.

The control device 100 acquires vehicle information relating to the vehicle 1 based on detection signals received from various sensors included in the vehicle 1, and controls the driving device 10 based on the acquired vehicle information.

Here, the vehicle information includes information indicating a traveling state of the vehicle 1. For example, the vehicle information includes, as the information indicating the traveling state of the vehicle 1, information indicating a speed of the vehicle 1 (hereinafter, also referred to as a vehicle speed), an accelerator pedal (AP) opening degree indicating an operation amount (that is, an accelerator position) with respect to an accelerator pedal provided in the vehicle 1, a required driving force of the vehicle 1 derived based on the vehicle speed, the AP opening and the like, the rotational speed of the engine ENG (hereinafter referred to as "the engine rotational speed"), and the like. In addition, the vehicle information further includes battery information related to the battery BAT included in the vehicle 1. The battery information includes, for example, information indicating a state of charge (SOC) of the battery BAT.

The control device 100 controls the driving device 10 based on the vehicle information to cause the vehicle 1 to travel in any of the plurality of traveling modes that the vehicle 1 can take. In the control of the driving device 10, for example, the control device 100 controls the output of power from the engine ENG by controlling the supply of fuel to the engine ENG, controls the output of power from the motor MOT by controlling the supply of electric power to the motor MOT, and controls the generation of electric power (for example, output voltage) of the generator GEN by controlling a field current or the like flowing through a coil of the generator GEN.

In the control of the driving device 10, the control device 100 controls the first clutch CL1 to be disengaged or engaged by controlling an actuator (not illustrated) that operates the first clutch CL1. Similarly, the control device 100 controls the second clutch CL2 to be disengaged or engaged by controlling an actuator (not illustrated) that operates the second clutch CL2.

In this way, by controlling the engine ENG, the generator GEN, the motor MOT, the first clutch CL1 and the second clutch CL2, the control device 100 can cause the vehicle 1 to travel in any of the plurality of traveling modes that the vehicle 1 can take. The control device 100 is an example of the control device of a vehicle according to the present disclosure, and is realized by an electronic control unit (ECU) including a processor, a memory, an interface, and the like, for example.

[Traveling Mode that Vehicle can Take]

Next, a traveling mode that the vehicle 1 can take will be described with reference to FIG. 2. In FIG. 2, as illustrated in a traveling mode table Ta, the vehicle 1 can take the plurality of traveling modes including the EV traveling mode, the hybrid traveling mode, the low-speed side engine traveling mode, and the high-speed side engine traveling mode.

[EV Traveling Mode]

The EV traveling mode is a traveling mode in which electric power is supplied to the motor MOT from the battery BAT, and the vehicle 1 is driven by the power output from the motor MOT in accordance with the electric power.

Specifically, in the EV traveling mode, the control device 100 controls both the first clutch CL1 and the second clutch CL2 to be disengaged. In the EV traveling mode, the control device 100 performs a control such that injection of fuel to the engine ENG is stopped (so-called fuel cut), and the output of the power from the engine ENG is stopped. In the EV traveling mode, the control device 100 performs a control such that electric power is supplied to the motor MOT from the battery BAT, and power corresponding to the electric power is output to the motor MOT (illustrated as Motor: "driven by battery"). As a result, in the EV traveling mode, the vehicle 1 travels on power that is output from the motor MOT according the electric power supplied from the battery BAT.

In the EV traveling mode, as described above, the output of the power from the engine ENG is stopped, and both the first clutch CL1 and the second clutch CL2 are disengaged. Therefore, in the EV traveling mode, no power is input to the generator GEN, and the generator GEN does not generate electric power (illustrated as Generator: "stop power generation").

[Hybrid Traveling Mode]

The hybrid traveling mode is an example of a first traveling mode in the present disclosure, and is a traveling mode in which electric power is supplied to the motor MOT at least from the generator GEN, and the vehicle 1 travels on the power output from the motor MOT in accordance with the electric power.

Specifically, in the case of the hybrid traveling mode, the control device 100 controls both the first clutch CL1 and the second clutch CL2 to be disengaged. In the case of the hybrid traveling mode, the control device 100 causes fuel to inject to the engine ENG to output power from the engine ENG. The power output from the engine ENG is input to the generator GEN via the generator gear train Gg. As a result, electric power generation by the generator GEN is performed.

In a case of the hybrid traveling mode, the control device 100 performs a control such that the electric power generated by the generator GEN is supplied to the motor MOT, and power corresponding to the electric power is output from the motor MOT (illustrated as Motor: "driven by generator"). The electric power supplied from the generator GEN to the motor MOT is greater than the electric power supplied from the battery BAT to the motor MOT. Therefore, in the hybrid traveling mode, the power output from the motor MOT (driving force of the motor MOT) can be increased as compared with the EV traveling mode, and a large driving force can be obtained as the driving force of the vehicle 1.

In the case of the hybrid traveling mode, the control device 100 may perform a control such that the electric power is supplied from the battery BAT to the motor MOT if necessary. That is, in the hybrid traveling mode, the control device 100 may perform a control such that electric power is supplied from both the generator GEN and the battery BAT to the motor MOT. As a result, the electric power supplied to the motor MOT can be increased compared to a case where electric power is supplied to the motor MOT only from the generator GEN, and a greater driving force can be obtained as the driving force of the vehicle 1.

In addition, even in the hybrid traveling mode, in order to provide a driver with a natural feeling in which the vehicle speed and an operating sound of the engine ENG are in conjunction with each other, as will be described later, the control device 100 controls the engine rotational speed such that when the engine rotational speed reaches a predetermined upper limit rotational speed, the engine rotational speed is temporarily lowered to a predetermined lower limit rotational speed and then the engine rotational speed is increased again. A specific control example of the engine rotational speed in the hybrid traveling mode will be described later.

[Low-Speed Side Engine Traveling Mode]

The low-speed side engine traveling mode is an example of a second traveling mode in the present disclosure, and is a traveling mode in which the power output from the engine ENG is transmitted to the driving wheels DW via the low-speed side power transmission path to cause the vehicle 1 to travel.

Specifically, in the case of the low-speed side engine traveling mode, the control device 100 perform a control such that fuel is injected to the engine ENG and power is output from the engine ENG. In addition, in the case of the low-speed side engine traveling mode, the control device 100 controls the first clutch CL1 to be engaged and the second clutch CL2 to be disengaged. Thus, in the low-speed side engine traveling mode, the power output from the engine ENG is transmitted to the driving wheels DW via the low-speed side engine gear train GLo, the final gear train Gf, and the differential mechanism D, and the vehicle 1 travels.

In the case of the low-speed side engine traveling mode, the power output from the engine ENG is also input to the generator GEN via the generator gear train Gg, but the generator GEN is controlled so as not to generate power. For example, in the low-speed side engine traveling mode, a switching element (for example, a switching element of an inverter device provided between the generator GEN and the battery BAT) provided in an electric power transmission path between the generator GEN and the battery BAT is turned off so that the generator GEN is controlled so as not to generate power. Accordingly, in the low-speed side engine traveling mode, loss caused by electric power generation of the generator GEN can be reduced, and an amount of heat generated by the generator GEN or the like can be reduced. In the low-speed side engine traveling mode, during braking of the vehicle 1, regenerative electric power generation may be performed by the motor MOT to charge the battery BAT with the generated electric power.

In the case of the low-speed side engine traveling mode, for example, the control device 100 stops the supply of electric power to the motor MOT, and stops the output of the power from the motor MOT. As a result, in the low-speed side engine traveling mode, a load on the motor MOT can be reduced, and an amount of heat generated by the motor MOT can be reduced.

In the case of the low-speed side engine traveling mode, the control device 100 may perform a control such that the electric power is supplied from the battery BAT to the motor MOT if necessary. Thus, in the low-speed side engine traveling mode, the vehicle 1 can travel using the power output from the motor MOT by the electric power supplied from the battery BAT, and as compared with the case where the vehicle 1 travels on only the power of the engine ENG, a greater driving force can be obtained as the driving force of the vehicle 1.

[High-Speed Side Engine Traveling Mode]

The high-speed side engine traveling mode is a traveling mode in which the power output from the engine ENG is transmitted to the driving wheels DW via the high speed-side power transmission path to cause the vehicle 1 to travel.

Specifically, in the case of the high-speed side engine traveling mode, the control device 100 performs a control such that fuel is injected to the engine ENG and power is output from the engine ENG. In addition, in the case of the high-speed side engine traveling mode, the control device 100 controls the second clutch CL2 to be engaged and the first clutch CL1 to be disengaged. Thus, in the high-speed side engine traveling mode, the power output from the engine ENG is transmitted to the driving wheels DW via the high-speed side engine gear train GHi, the final gear train Gf, and the differential mechanism D to cause the vehicle 1 to travel.

In the case of the high-speed side engine traveling mode, the power output from the engine ENG is also input to the generator GEN via the generator gear train Gg, but the generator GEN is controlled so as not to generate power. As a result, in the high-speed side engine traveling mode, the loss caused by the electric power generation of the generator GEN can be reduced, and the amount of heat generated by the generator GEN or the like can be reduced. Even in the high-speed side engine traveling mode, during braking of the vehicle 1, regenerative electric power generation may be performed by the motor MOT to charge the battery BAT with the generated electric power.

In the case of the high-speed side engine traveling mode, for example, the control device 100 stops the supply of electric power to the motor MOT, and stops the output of the power from the motor MOT. As a result, in the high-speed side engine traveling mode, the load on the motor MOT can be reduced, and the amount of heat generated by the motor MOT can be reduced.

In the case of the high-speed side engine traveling mode, the control device 100 may perform a control such that the electric power is supplied from the battery BAT to the motor MOT if necessary. Thus, in the high-speed side engine traveling mode, the vehicle 1 can also travel using the power output from the motor MOT based on the electric power supplied from the battery BAT, and as compared with the case where the vehicle 1 travels on only the power of the engine ENG, a greater driving force can be obtained as the driving force of the vehicle 1.

[Transition Example of Traveling Mode]

Figure 3:
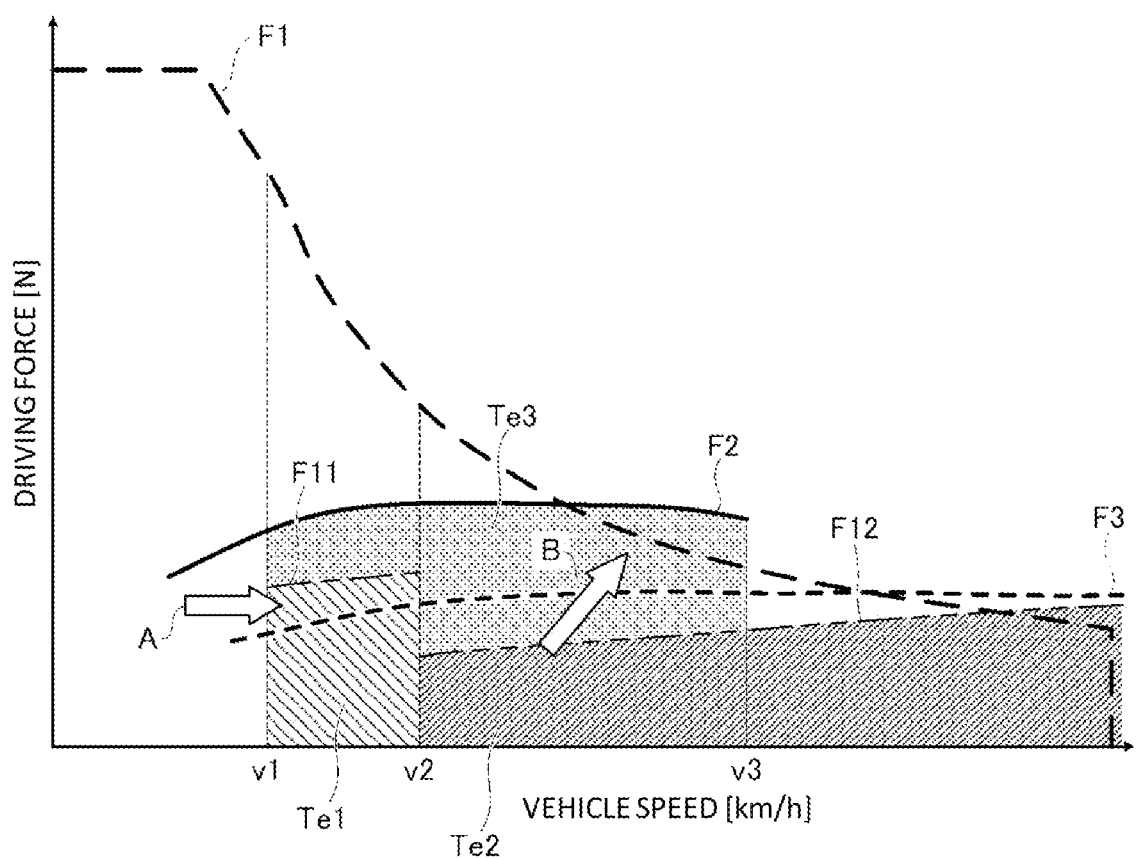
FIG. 3 is a diagram illustrating a transition example of the traveling mode.

Next, a transition example of the traveling mode in the vehicle 1 will be described with reference to FIG. 3. FIG. 3 illustrates a relationship between the driving force and the vehicle speed of the vehicle 1 in the hybrid traveling mode, the low-speed side engine traveling mode, and the high-speed side engine traveling mode. In FIG. 3, a vertical axis indicates the driving force [N] of the vehicle 1, and a horizontal axis indicates the vehicle speed [km/h].

A driving force F1 illustrated in FIG. 3 is the maximum driving force of the vehicle 1 in the hybrid traveling mode. That is, the driving force F1 is the maximum driving force of the vehicle 1 obtained by supplying the electric power generated by the generator GEN by the power of the engine ENG to the motor MOT.

A driving force F2 illustrated in FIG. 3 is the maximum driving force of the vehicle 1 in the low-speed side engine traveling mode. That is, the driving force F2 is the maximum driving force of the vehicle 1 obtained by transmitting the power of the engine ENG to the axle DS (that is, the driving wheel DW) by the low-speed side power transmission path.

A driving force F3 illustrated in FIG. 3 is the maximum driving force of the vehicle 1 in the high-speed side engine traveling mode. That is, the driving force F3 is the maximum driving force of the vehicle 1 obtained by transmitting the power of the engine ENG to the axle DS (that is, the driving wheel DW) by the high-speed side power transmission path.

A first applicable range Te1 illustrated in FIG. 3 indicates a first traveling state of the vehicle 1 that is applicable to travel in the low-speed side engine traveling mode. Specifically, the first applicable range Te1 indicates a range in which the vehicle speed is in a range of v1 to v2, and the driving force of the vehicle 1 is equal to or less than a predetermined driving force F11. In the present embodiment, when the traveling state of the vehicle 1 is included in the first applicable range Te1, the vehicle 1 can travel with less fuel consumption in the low-speed side engine traveling mode as compared with the case where the vehicle 1 travels in the hybrid traveling mode or the high-speed side engine traveling mode.

Therefore, for example, when the traveling state of the vehicle 1 is included in the first applicable range Te1 due to an increase in the vehicle speed while the vehicle 1 is traveling in the hybrid traveling mode, as illustrated by an arrow A in FIG. 3, the control device 100 shifts from the hybrid traveling mode to the low-speed side engine traveling mode. Hereinafter, the state in which the traveling state of the vehicle 1 is included in the first applicable range Te1 when the vehicle 1 is traveling in the hybrid traveling mode is also referred to as "establishment of a transition condition from the hybrid traveling mode to the low-speed side engine traveling mode".

When the traveling state of the vehicle 1 is included in the first applicable range Te1, the control device 100 may intermittently switch the traveling mode between the low-speed side engine traveling mode and the EV traveling mode. For example, when the traveling state of the vehicle 1 is included in the first applicable range Te1, based on a remaining capacity of the battery BAT, a temperature of the motor MOT, or the like, the control device 100 can cause the vehicle 1 to travel in a more appropriate traveling mode by intermittently switching the traveling mode between the low-speed side engine traveling mode and the EV traveling mode.

A second applicable range Te2 illustrated in FIG. 3 indicates the traveling state of the vehicle 1 that is applicable to travel in the high-speed side engine traveling mode. Specifically, the second applicable range Te2 indicates a range in which the vehicle speed is greater than v2 and the driving force of the vehicle 1 is equal to or less than a predetermined driving force F12. In the present embodiment, when the traveling state of the vehicle 1 is included in the second applicable range Te2, the vehicle 1 can travel with less fuel consumption in the high-speed side engine traveling mode as compared with the case where the vehicle 1 travels in the hybrid traveling mode. In addition, in the range of v2 to v3 of the vehicle speed included in the second applicable range Te2, the vehicle 1 can travel in the low-speed side engine traveling mode, but the vehicle 1 can travel in the high-speed side engine traveling mode with less fuel consumption than in the low-speed side engine traveling mode. Therefore, when the traveling state of the vehicle 1 is the second applicable range Te2, the control device 100 causes the vehicle 1 to travel in the high-speed side engine traveling mode.

When the traveling state of the vehicle 1 is included in the second applicable range Te2, the control device 100 may intermittently switch the traveling mode between the high-speed side engine traveling mode and the EV traveling mode. For example, when the traveling state of the vehicle 1 is included in the second applicable range Te2, based on a remaining capacity of the battery BAT, a temperature of the motor MOT, or the like, the control device 100 can cause the vehicle 1 to travel in a more appropriate traveling mode by intermittently switching the traveling mode between the high-speed side engine traveling mode and the EV traveling mode.

A third applicable range Te3 illustrated in FIG. 3 indicates a second traveling state of the vehicle 1 that is applicable to travel in the low-speed side engine traveling mode. Specifically, the third applicable range Te3 indicates a range in which the vehicle speed is in a range of v1 to v3, the driving force of the vehicle 1 is equal to or greater than the driving force F11 and is equal to or less than the driving force F2 when the vehicle speed is in the range of v1 to v2, and the driving force of the vehicle 1 is equal to or greater than the driving force F12 and equal to or less than the driving force F2 when the vehicle speed is in the range of v2 to v3. In the present embodiment, when the traveling state of the vehicle 1 is included in the third applicable range Te3, the vehicle 1 can travel in the low-speed side engine traveling mode while suppressing heat generation of the motor MOT, the generator GEN, the engine ENG or the like as compared with the case where the vehicle 1 travels in the hybrid traveling mode or the high-speed side engine traveling mode.

Therefore, for example, when the traveling state of the vehicle 1 is included in the third applicable range Te3 due to an increase in the driving force of the vehicle 1 while the vehicle 1 is traveling in the high-speed side engine traveling mode, as illustrated by an arrow B in FIG. 3, the control device 100 shifts the traveling mode from the high-speed side engine traveling mode to the low-speed side engine traveling mode. Specifically, at this time, as will be described later, the control device 100 shifts the traveling mode from the high-speed side engine traveling mode to the hybrid traveling mode, and then shifts the traveling mode from the hybrid traveling mode to the low-speed side engine traveling mode. Hereinafter, the state, in which the traveling state of the vehicle 1 is included in the third applicable range Te3 when the vehicle 1 is traveling in the high-speed side engine traveling mode, is also referred to as "establishment of a transition condition from the high-speed side engine traveling mode to the low-speed side engine traveling mode".

[Functional Configuration of Control Device]

Figure 4:
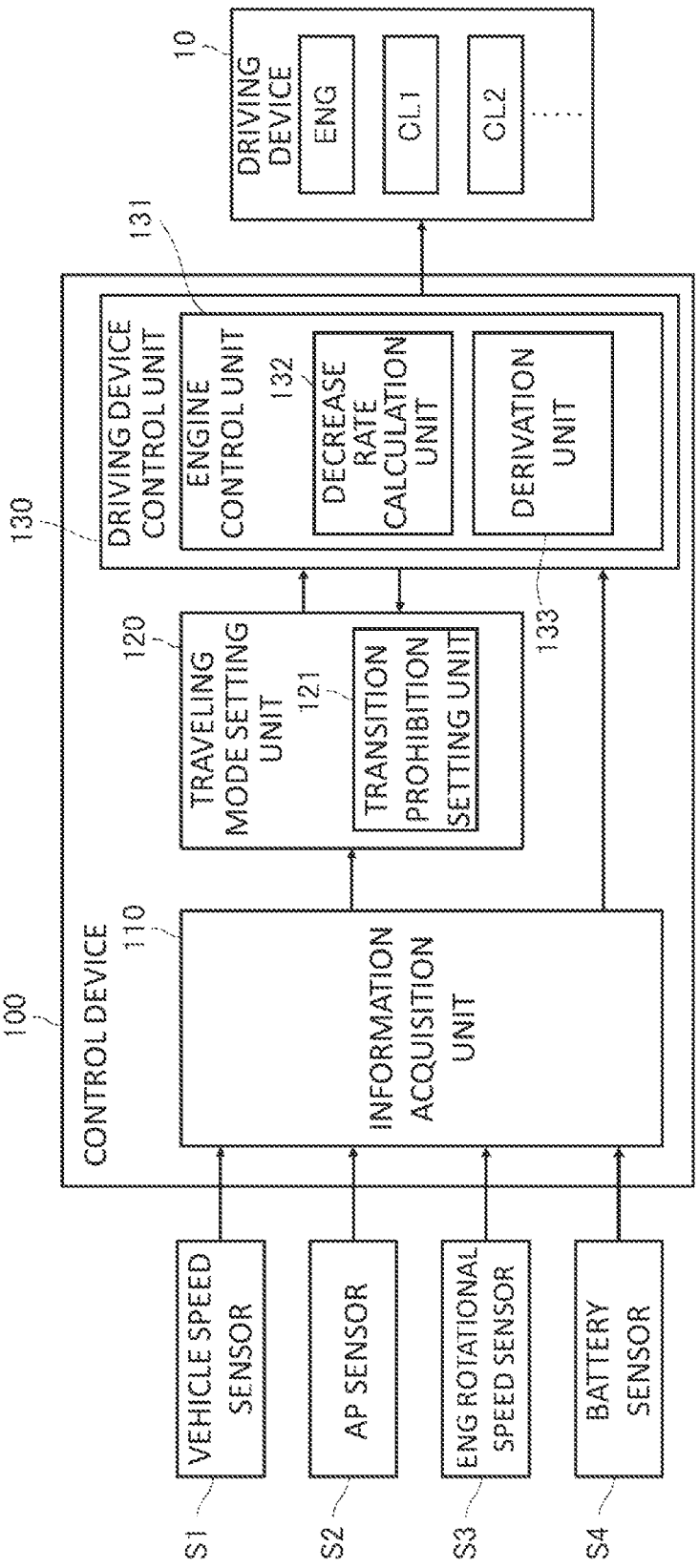
FIG. 4 is a block diagram illustrating a functional configuration of the control device.

Next, a functional configuration of the control device 100 will be described with reference to FIGS. 4 to 8. As illustrated in FIG. 4, the control device 100 includes an information acquisition unit 110, a traveling mode setting unit 120 for setting a traveling mode, and a driving device control unit 130 that controls the driving device 10. For example, the information acquisition unit 110, the traveling mode setting unit 120, and the driving device control unit 130 can realize the functions thereof by executing a program stored in a memory by a processor of an ECU that realizes the control device 100, or by an interface of the ECU.

The information acquisition unit 110 acquires vehicle information related to the vehicle 1 based on detection signals and the like sent from various sensors included in the vehicle 1 to the control device 100. Then, the information acquisition unit 110 passes the acquired vehicle information to the traveling mode setting unit 120 and the driving device control unit 130. As described above, the vehicle information includes, for example, information indicating the traveling state of the vehicle 1 such as the vehicle speed, the AP opening degree, the required driving force, and the engine rotational speed.

The vehicle speed can be acquired, for example, based on a detection signal from a vehicle speed sensor S1 that detects a rotational speed of the axle DS. The AP opening degree can be acquired based on a detection signal from an accelerator position sensor (illustrated as AP sensor) S2 that detects an operation amount of the accelerator pedal provided in the vehicle 1. The required driving force can be acquired by deriving the driving force based on the vehicle speed acquired based on the detection signal from the vehicle speed sensor S1 or the AP opening degree acquired based on the detection signal from the AP sensor S2. The engine rotational speed can be acquired, for example, based on a detection signal from an engine rotational speed sensor (ENG rotational speed sensor) S3 that detects the engine rotational speed.

As described above, the vehicle information further includes the battery information. The battery information can be acquired, for example, based on a detection signal from a battery sensor S4 that detects a state of the battery BAT. Specifically, the battery sensor S4 detects an inter-terminal voltage, a charge/discharge current, a temperature, and the like of the battery BAT, and transmits a detection signal indicating the detected information to the control device 100. The information acquisition unit 110 derives the SOC of the battery BAT based on the inter-terminal voltage, the charge/discharge current, and the like of the battery BAT detected by the battery sensor S4, and acquires the batter information including the derived SOC information. The battery information may include information such as the inter-terminal voltage, the charge/discharge current, the temperature, and the like of the battery BAT detected by the battery sensor S4.

The traveling mode setting unit 120 sets one of the plurality of traveling modes that the vehicle 1 can take, and notifies the driving device control unit 130 of the set traveling mode. For example, information indicating a setting condition of each traveling mode is stored in advance in the control device 100. Here, the information indicating the setting condition of each traveling mode is, for example, information in which the traveling state of the vehicle 1 and the traveling mode (that is, the traveling mode to be set) applicable to the traveling state are associated with each other.

The traveling mode setting unit 120 sets a traveling mode that is applicable to the traveling state of the vehicle 1 with reference to the vehicle information acquired from the information acquisition unit 110 and the information indicating the setting condition of each traveling mode stored in the control device 100.

For example, when the transition condition from the hybrid traveling mode to the low-speed side engine traveling mode is satisfied, the traveling mode setting unit 120 shifts the hybrid traveling mode to the low-speed side engine traveling mode. Specifically, in this case, the traveling mode setting unit 120 sets the low-speed side engine traveling mode and notifies the driving device control unit 130 that the traveling mode is set to the low-speed side engine traveling mode. As a result, the driving device control unit 130 performs a control such that the first clutch CL1 is engaged and the traveling mode is shifted to the low-speed side engine traveling mode.

Further, for example, when the transition condition from the high-speed side engine traveling mode to the low-speed side engine traveling mode is satisfied, the traveling mode setting unit 120 shifts the traveling mode from the high-speed side engine traveling mode to the low-speed side engine traveling mode via the hybrid traveling mode. Specifically, in this case, the traveling mode setting unit 120 first sets the hybrid traveling mode and notifies the driving device control unit 130 that the traveling mode is set to the hybrid traveling mode. As a result, the driving device control unit 130 performs a control such that the second clutch CL2 is disengaged and the traveling mode is shifted to the hybrid traveling mode. Subsequently, the traveling mode setting unit 120 sets the low-speed side engine traveling mode and notifies the driving device control unit 130 that the traveling mode is set to the low-speed side engine traveling mode. As a result, the driving device control unit 130 performs a control such that the first clutch CL1 is engaged and the traveling mode is shifted to the low-speed side engine traveling mode.

The driving device control unit 130 controls the driving device 10 based on the traveling mode set by the traveling mode setting unit 120 and the vehicle information acquired by the information acquisition unit 110. The driving device control unit 130 includes, for example, an engine control unit 131 that controls the engine ENG.

In the case of the low-speed side engine traveling mode or the high-speed side engine traveling mode, the engine control unit 131 controls the engine ENG such that the engine ENG outputs a driving force for realizing the required driving force indicated by the vehicle information.

In the case of the hybrid traveling mode, the engine control unit 131 controls the engine ENG (that is, power generation of the generator in this case) such that the motor MOT outputs a driving force for realizing the required driving force indicated by the vehicle information. Further, in the case of the hybrid traveling mode, the engine control unit 131 performs a control such that the engine rotational speed fluctuates between a predetermined upper limit rotational speed NeH and a lower limit rotational speed NeL.

[Engine Rotational Speed in Hybrid Traveling Mode]

Figure 5:
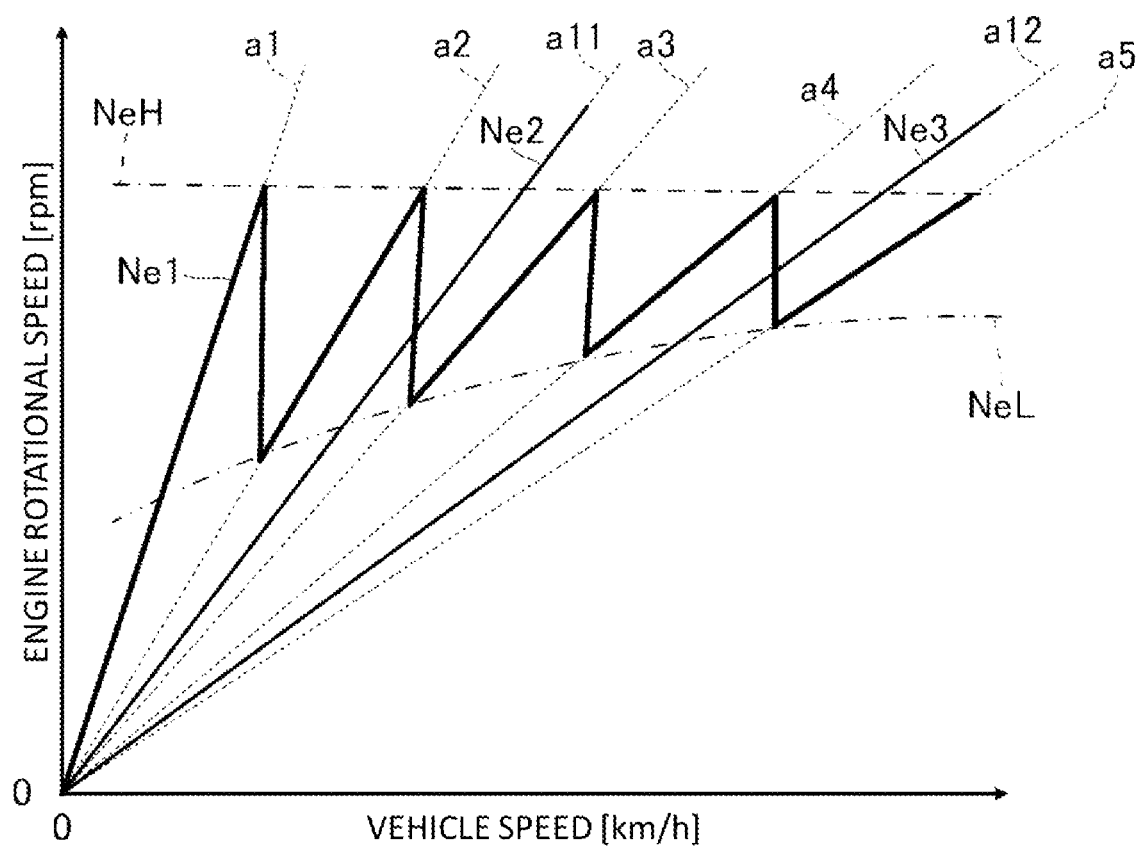
FIG. 5 is a diagram illustrating a control example of an engine rotational speed in a hybrid traveling mode.

FIG. 5 illustrates an example of the control of the engine rotational speed performed by the engine control unit 131 in the hybrid traveling mode. In FIG. 5, a vertical axis indicates the engine rotational speed [rpm], and a horizontal axis indicates the vehicle speed [km/h].

An engine rotational speed Ne1 illustrated in FIG. 5 is an engine rotational speed in the hybrid traveling mode. As indicated by the engine rotational speed Ne1, in the case of the hybrid traveling mode, the engine control unit 131 controls the engine rotational speed so as to fluctuate between the predetermined upper limit rotational speed NeH and the lower limit rotational speed NeL.

Specifically, in the case of the hybrid traveling mode, the engine control unit 131 first increases the engine rotational speed as the vehicle speed increases at a predetermined increase rate a1 from a state where both the vehicle speed and the engine rotational speed are 0 (zero). Then, when the engine rotational speed reaches the upper limit rotational speed NeH corresponding to the vehicle speed at that time, the engine rotational speed is decreased to the lower limit rotational speed NeL corresponding to the vehicle speed at that time. After that, the engine control unit 131 increases the engine rotational speed from the lower limit rotational speed NeL as the vehicle speed increases again. However, at this time, the engine rotational speed is increased at an increase rate a2 smaller than the increase rate a1.

In the same way thereafter, the engine control unit 131 decreases the engine rotational speed to the lower limit rotational speed NeL when the engine rotational speed reaches the upper limit rotational speed NeH, and as the vehicle speed increases, increases the engine rotational speed while changing the increase rate 2 to an increase rate a3, an increase rate a4, an increase rate a5 each time. Here, the increase rate a2>the increase rate a3>the increase rate a4>the increase rate a5.

In the hybrid traveling mode, since both the first clutch CL1 and the second clutch CL2 are disengaged as described above, the engine rotational speed can be set freely regardless of the vehicle speed. However, by controlling the engine rotational speed so as to fluctuate between the upper limit rotational speed NeH and the lower limit rotational speed NeL as the vehicle speed increases, the driver can feel a natural change in an operating sound of the engine ENG in conjunction with the vehicle speed as if the gear is shifted by a stepped transmission even the vehicle 1 is traveling in the hybrid traveling mode.

The engine rotational speed Ne2 illustrated in FIG. 5 is an engine rotational speed in the low-speed side engine traveling mode. As described above, in the low-speed side engine traveling mode, the engine ENG and the axle DS (that is, the driving wheels DW) are mechanically connected. Therefore, as indicated by the engine rotational speed Ne2, the engine rotational speed and the vehicle speed linearly correspond to each other. Specifically, in the present embodiment, in the case of the low-speed side engine traveling mode, the engine rotational speed increases at an increase rate a11 as the vehicle speed increases. For example, the increase rate a2>the increase rate a11>the increase rate a3.

An engine rotational speed Ne3 illustrated in FIG. 5 is an engine rotational speed in the high-speed side engine traveling mode. As described above, in the high-speed side engine traveling mode, the engine ENG and the axle DS are mechanically connected in the same manner as the low-speed side engine traveling mode. Therefore, as indicated by the engine rotational speed Ne3, the engine rotational speed and the vehicle speed linearly correspond to each other. Specifically, in the present embodiment, in the case of the high-speed side engine traveling mode, the engine rotational speed increases at an increase rate a12 as the vehicle speed increases. For example, the increase rate a4>the increase rate a12>the increase rate a5.

Note that although FIG. 5 also illustrates the engine rotational speed Ne2 and the engine rotational speed Ne3 in a state where the vehicle speed is 0 (zero) for the sake of convenience, the low-speed side engine traveling mode or the high-speed side engine traveling mode does not actually set when the vehicle speed is 0 (zero).

[First Example of Control Performed Regarding Transition to Low-Speed Side Engine Traveling Mode]

Figure 6:
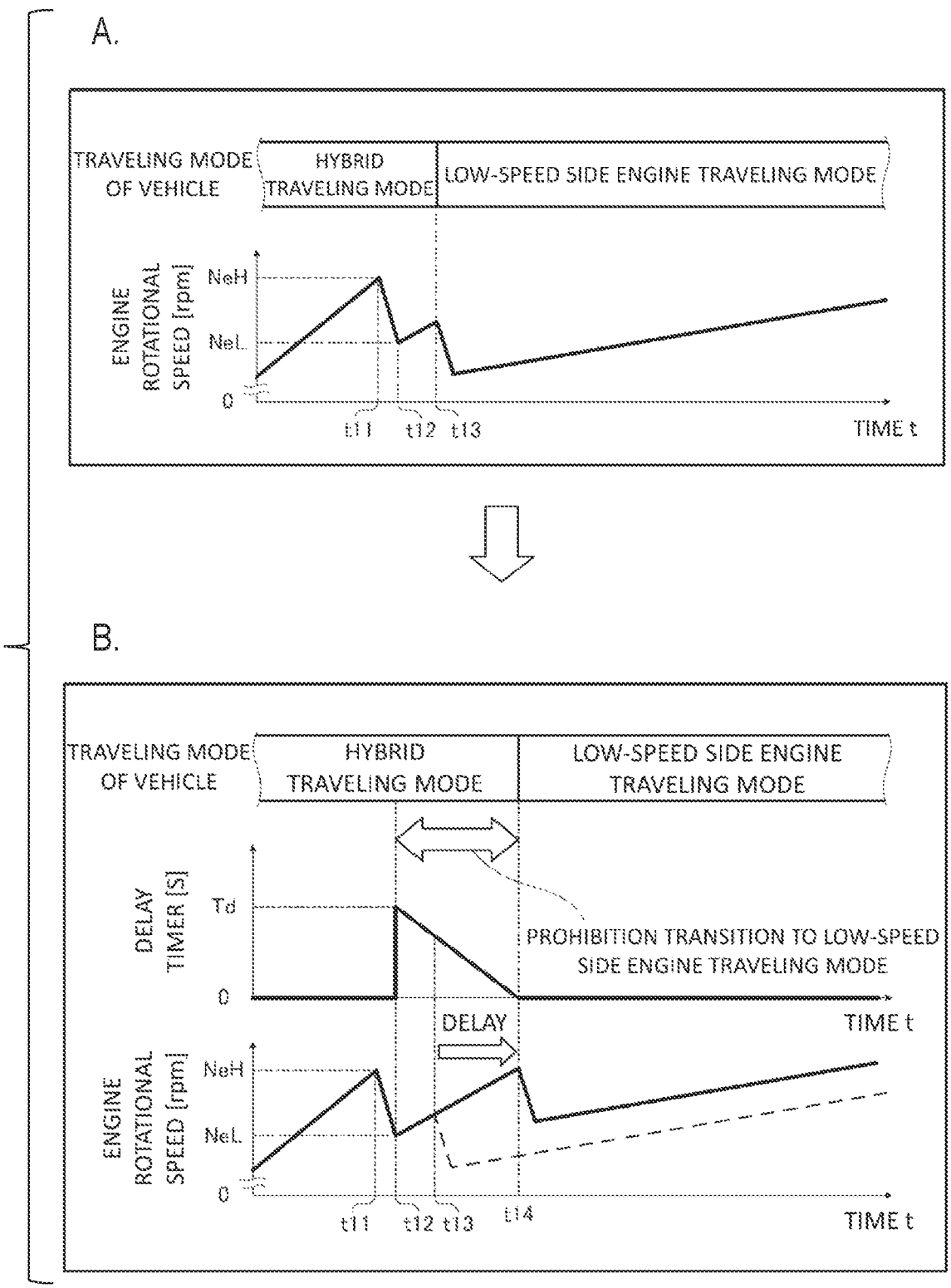
FIG. 6 is a diagram illustrating a first example of a control performed regarding a transition to a low-speed side engine traveling mode.

FIG. 6 illustrated a first example of a control performed by the control device 100 during the transition to the low-speed side engine traveling mode. The first example is an example in which the transition indicated by the arrow A in FIG. 3, that is, the transition from the hybrid traveling mode to the low-speed side engine traveling mode is performed when a transition condition from the hybrid traveling mode to the low-speed side engine traveling mode is satisfied, for example.

First, before describing the control performed by the control device 100, a problem that may occur during the transition from the hybrid traveling mode to the low-speed side engine traveling mode will be described with reference to (a) in FIG. 6.

As illustrated in section A in FIG. 6, it is assumed that the engine rotational speed reaches the upper limit rotational speed NeH at a time point t11 when the vehicle 1 is traveling in the hybrid traveling mode. Therefore, it is assumed that the engine rotational speed is decreased to the lower limit rotational speed NeL at a time point t12 immediately after the time point t11. The engine rotational speed decreased to the lower limit rotational speed NeL is then again controlled to increase toward the upper limit rotational speed NeH as the vehicle speed increases.

However, the transition condition from the hybrid traveling mode to the low-speed side engine traveling mode may be satisfied depending on the traveling state of the vehicle 1 at a time point t13 (for example, a time point immediately after the time point t12) before the engine rotational speed decreased at time t12 is sufficiently increased. In such a case, when shift to the low-speed side engine traveling mode is performed at the time point t13, as illustrated in section A in FIG. 6, the engine rotational speed decreased at the time point t12 may again be decreased due to the transition to the low-speed side engine traveling mode. In this way, when a change in the engine rotational speed that is not intended by the driver occurs a plurality of times within a short period of time, the driver may feel uncomfortable or may misunderstand a failure of the engine ENG.

Therefore, when the engine rotational speed is decreased to the lower limit rotational speed NeL in the hybrid traveling mode, the control device 100 prohibits the transition to the low-speed side engine traveling mode for a predetermined period from the time when the lower limit rotational speed NeL is set.

This will be described in detail below with reference to section B in FIG. 6. As illustrated in section B in FIG. 6, it is assumed that the engine rotational speed reaches the upper limit rotational speed NeH at the time point t11 when the vehicle 1 is traveling in the hybrid traveling mode, as in the example of section A in FIG. 6. Therefore, at the time point t12 immediately after the time point t11, the engine control unit 131 decreases the engine rotational speed to the lower limit rotational speed NeL. When the engine rotational speed is decreased to the lower limit rotational speed NeL, the engine control unit 131 notifies the traveling mode setting unit 120 to that fact.

When the traveling mode setting unit 120 receives a notification that the engine rotational speed is decreased from the engine control unit 131, a transition prohibition setting unit 121 (see FIG. 4) included in the traveling mode setting unit 120 sets Td [s] to a delay timer. Here, the delay timer is, for example, a timing unit that counts down from the set Td [s] toward 0 (zero). Here, td [s] is a predetermined time. As illustrated in section B in FIG. 6, during a period in which a count value of the delay timer is greater than 0 (zero), the transition to the low-speed side engine traveling mode is prohibited.

For example, it is assumed that the transition condition from the hybrid traveling mode to the low-speed side engine traveling mode is satisfied at the time point t13 when the count value of the delay timer is greater than 0 (zero). In such a case, the traveling mode setting unit 120 does not perform the transition from the hybrid traveling mode to the low-speed side engine traveling mode at the time point 13. In this way, the traveling mode setting unit 120 does not perform the transition to the low-speed side engine traveling mode during the predetermined period from the time when the engine rotational speed is decreased to the lower limit rotational speed NeL, so that it is possible to prevent a change in the engine rotational speed that is not intended by the driver from being generated a plurality of times within a short period of time (see a dotted line in section B in FIG. 6).

When the transition condition from the hybrid traveling mode to the low-speed side engine traveling mode is satisfied at the time point t13 when the count value of the delay timer is greater than 0 (zero), the traveling mode setting unit 120 thereafter shifts from the hybrid traveling mode to the low-speed side engine traveling mode at a time point t14 when the count value of the delay timer becomes 0 (zero). That is, as illustrated in section B in FIG. 6, the transition from the hybrid traveling mode to the low-speed side engine traveling mode is shifted (delayed) backward from the time point t13 to the time point t14.

In this way, when the transition condition from the hybrid traveling mode to the low-speed side engine traveling mode is satisfied during a period in which the transition to the low-speed side engine traveling mode is prohibited, the traveling mode setting unit 120 performs a transition to the low-speed side engine traveling mode when the period ends. Accordingly, after the period during which the transition to the low-speed side engine traveling mode is prohibited ends, the vehicle 1 can be efficiently driven by the low-speed side engine traveling mode suitable for the traveling state of the vehicle 1.

In the above example, the traveling mode setting unit 120 may determine again whether the transition from the hybrid traveling mode to the low-speed side engine traveling mode is performed based on the traveling state of the vehicle 1 at the time point t14 when the count value of the delay timer becomes 0 (zero), for example. In this way, when the vehicle is no longer suitable for driving in the low-speed side engine traveling mode at the end of the period during which the transition from the hybrid traveling mode to the low-speed side engine traveling mode is prohibited, it is possible to prevent the transition to the low-speed side engine traveling mode.

Further, although an example in which the delay timer counts down from Td [s] to 0 (zero) has been described, but the present disclosure is not limited to this, and the delay timer may be counted up from 0 (zero) to Td [s]. Also in this case, when the count value of the delay timer is greater than 0 (zero), the traveling mode setting unit 120 prohibits the transition to the low-speed side engine traveling mode. In this case, the transition prohibition setting unit 121 resets the count value of the delay timer to 0 (zero) when counting up to Td [s] by the delay timer ends, for example. In addition, the delay timer may be provided inside the control device 100 or may be provided outside the control device 100 in a state in which the control device 100 is accessible.

Although it is illustrated that the low-speed side engine traveling mode is continuously set from the hybrid traveling mode in FIG. 6, but in practice, there is a transition period for engaging the first clutch CL1 between these.

Further, the control device 100 sets the decrease rate of the engine rotational speed in the hybrid traveling mode and the decrease rate of the engine rotational speed at the time of transition from the hybrid traveling mode to the low-speed side engine traveling mode at the same rate, so that it is possible to shift to the low-speed side engine traveling mode without giving the driver a sense of discomfort due to an operating sound of the engine ENG at the time of the transition from the hybrid traveling mode to the low-speed side engine traveling mode.

Figure 7:
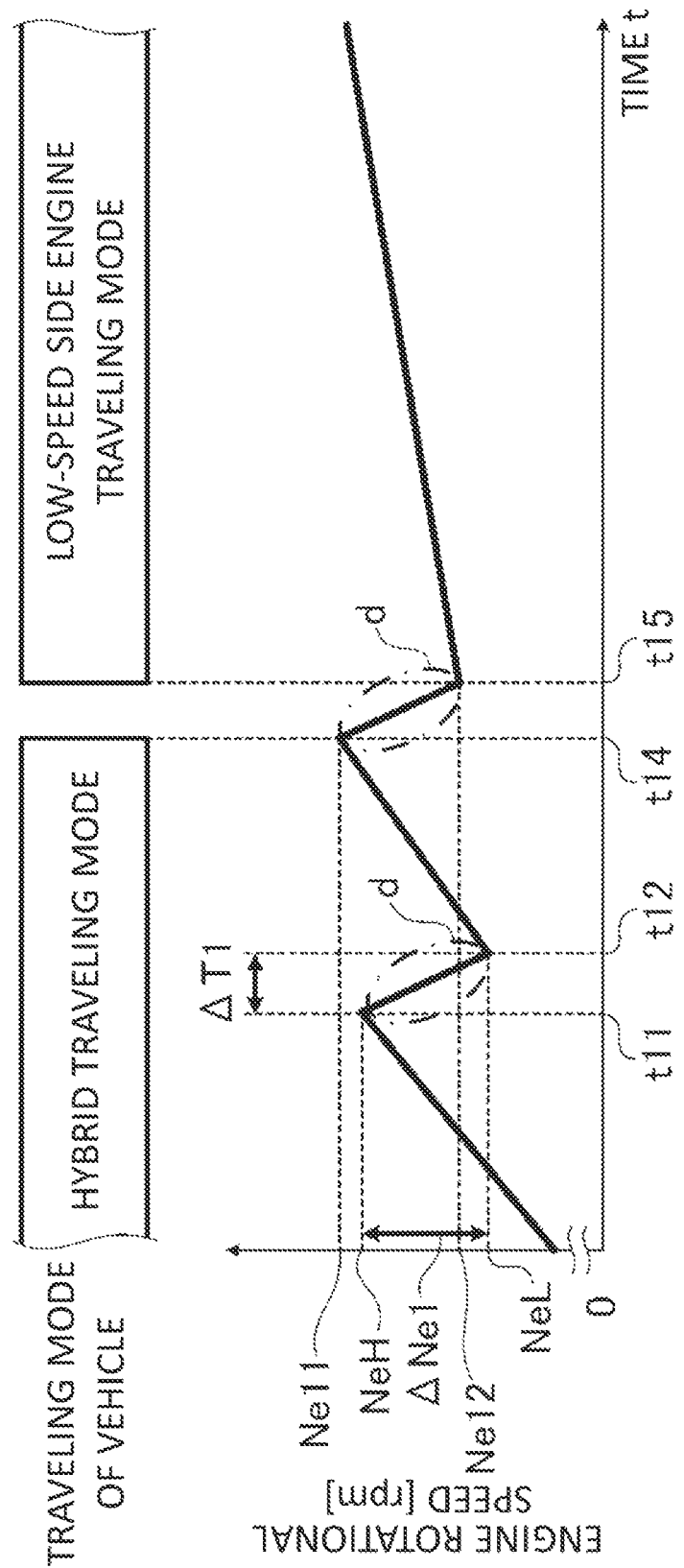
FIG. 7 is a diagram illustrating a decrease rate of the engine rotational speed in the hybrid traveling mode and a decrease rate of the engine rotational speed in the transition to the low-speed side engine traveling mode.

This will be described in detail below with reference to FIG. 7. In the following description of FIG. 7, the description of the same parts as those in FIG. 6 will be omitted as appropriate. As illustrated in FIG. 7, since the engine rotational speed reaches the upper limit rotational speed NeH at the time point t11 in the hybrid traveling mode, the engine control unit 131 decreased the engine rotational speed to the lower limit rotational speed NeL at the time point t12.

As described above, when the engine rotational speed is decreased from the upper limit rotational speed NeH to the lower limit rotational speed NeL in the hybrid traveling mode, a decrease rate calculation unit 132 (see FIG. 4) included in the engine control unit 131 calculates a decrease rate d of the engine rotational speed per unit time at this time.

In the example illustrated in FIG. 7, the decrease rate d calculated by the decrease rate calculation unit 132 is a decrease rated=$\Delta Ne1/\Delta T1$. Here, $\Delta Ne1$ is a value obtained by subtracting the lower limit rotational speed NeL at the time point t12 from the upper limit rotational speed NeH at the time point t1. Here, $\Delta T1$ is an elapsed time from the time point t11 to the time point 12. That is, the decrease rate calculation unit 132 can obtain $\Delta T1$ by measuring the elapsed time from the time point t11 to the time point t12.

For example, the decrease rate calculation unit 132 calculates the decrease rate d each time the engine rotational speed is lowered from the upper limit rotational speed NeH to the lower limit rotational speed NeL in the hybrid traveling mode, and stores the calculated decrease rate d in a memory of the control device 100 or the like. Note that only the decrease rate d calculated most recently by the decrease rate calculation unit 132 may be stored in the control device 100. That is, each time the decrease rate d is calculated by the decrease rate calculation unit 132, the decrease rate d stored in the control device 100 may be updated.

In the example illustrated in FIG. 7, it is assumed that the hybrid traveling mode is set by the traveling mode setting unit 120 at the time point t14 after the time point t12. In this case, the engine control unit 131 decreases the engine rotational speed from Ne11 to Ne12 at the decrease rate d calculated most recently by the decrease rate calculation unit 132 from the time point t14. Then, the driving device control unit 130 controls the first clutch CL1 to be engaged when the engine rotational speed decreases to Ne12. As a result, the traveling mode is shifted to the low-speed side engine traveling mode.

Here, Ne12 is a value obtained by, for example, Ne12=the number of rotations of the motor MOT at the time point t14×(the number of teeth of the motor drive gear 52/the number of teeth of the motor driven gear 66)×(the number of teeth of the low-speed side driven gear 60/the number of teeth of the low-speed side drive gear 34). Accordingly, the rotational speed of the low-speed side drive gear 34 and the rotational speed of the input shaft 21 can be matched.

For example, the engine control unit 131 may decrease the engine rotational speed at the decrease rated from the time point t14 without obtaining the above Ne12. In this case, the driving device control unit 130 may control the first clutch CL1 to be engaged when the engine rotational speed decreased by the engine control unit 131 becomes the engine rotational speed corresponding to the vehicle speed at that time in the low-speed side engine traveling mode.

In this way, the control device 100 aligns the decrease rate d of the engine rotational speed in the hybrid traveling mode with the decrease rate d of the engine rotational speed at the time of the transition from the hybrid traveling mode to the low-speed side engine traveling mode. As a result, the control device 100 can provide consistency between a change behavior of the engine rotational speed in the hybrid traveling mode and a change behavior of the engine rotational speed at the time of the transition from the hybrid traveling mode to the low-speed side engine traveling mode. Therefore, when shifting from the hybrid traveling mode to the low-speed side engine traveling mode, it is possible to shift to the low-speed side engine traveling mode without giving the driver a sense of discomfort due to an operating sound of the engine ENG.

[Second Example of Control Performed Regarding Transition to Low-Speed Side Engine Traveling Mode]

Figure 8:
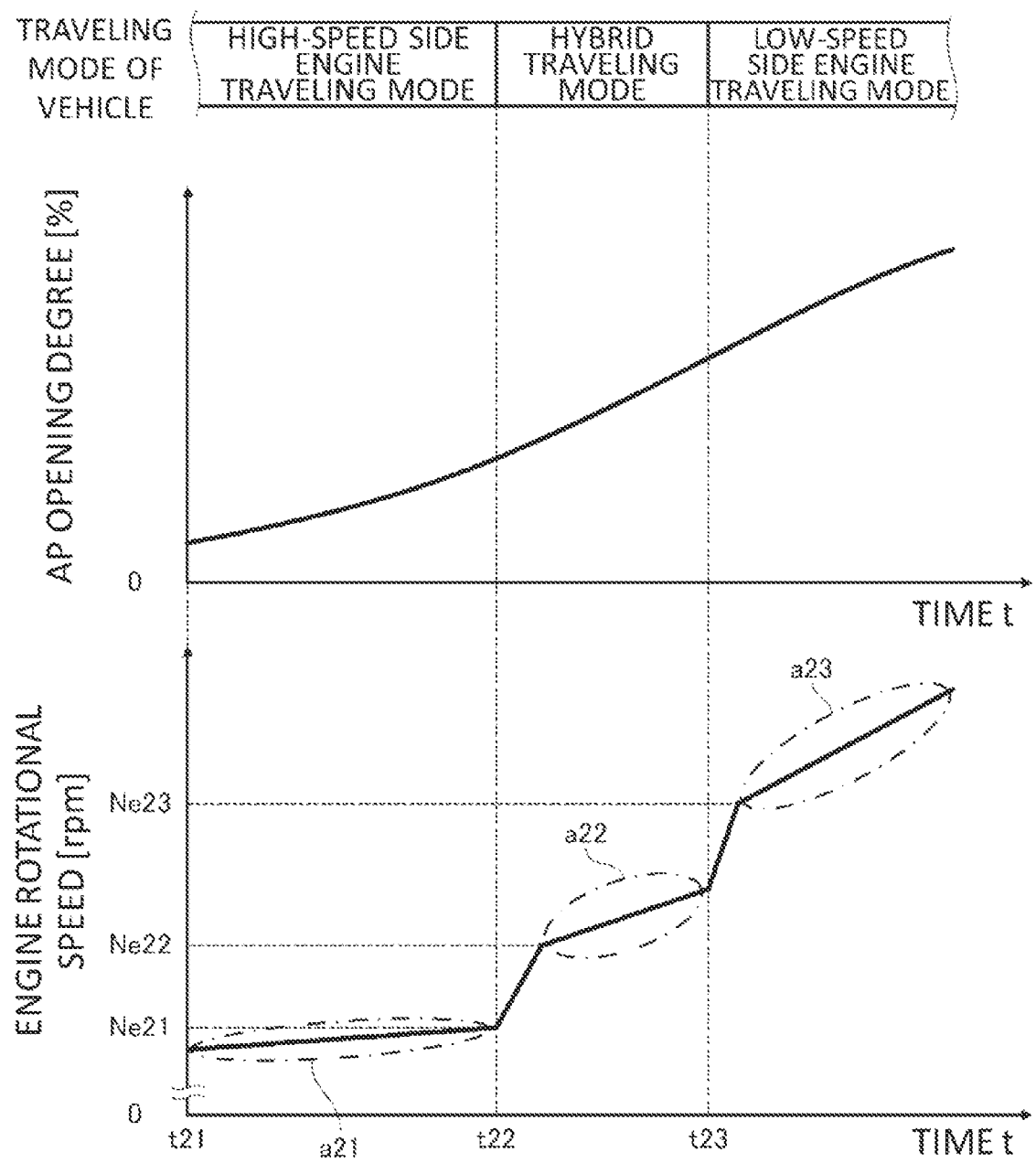
FIG. 8 is a diagram illustrating a second example of a control performed regarding the transition to the low-speed side engine traveling mode.

FIG. 8 illustrates a second example of the control performed by the control device 100 during the transition to the low-speed side engine traveling mode. The second example is an example in which the transition indicated by an arrow B in FIG. 3, that is, the transition from the high-speed side engine traveling mode to the low-speed side engine traveling mode is performed via the hybrid traveling mode when a transition condition from the high-speed side traveling mode to the low-speed side engine traveling mode is satisfied, for example.

The reduction ratio of the low-speed side power transmission path used in the low-speed side engine traveling mode is greater than the reduction ratio of the high-speed side power transmission path used in the high-speed side engine traveling mode. Therefore, due to a difference between the reduction ratio of the low-speed side power transmission path and the reduction ratio of the high-speed side power transmission path, when the high-speed side engine traveling mode is directly shifted to the low-speed side engine traveling mode, an abrupt increase (rise) in the engine rotational speed may occur, which may reduce commercial value of the vehicle 1 from a viewpoint of NV.

Therefore, when the transition condition from the high-speed side engine traveling mode to the low-speed side engine traveling mode is satisfied, the control device 100 once shifts from the high-speed side engine traveling mode to the hybrid traveling mode, and then shifts from the hybrid traveling mode to the low-speed side engine traveling mode. As described above, the control device 100 shifts the traveling mode to the low-speed side engine traveling mode via the hybrid traveling mode having a high degree of freedom of the engine rotational speed with respect to the vehicle speed, makes it possible to shift to the low-speed side engine traveling mode while suppressing an abrupt increase in the engine rotational speed during the transition to the low-speed side engine traveling mode.

More specifically, at the time point t21 illustrated in FIG. 8, the vehicle 1 is traveling in the high-speed side engine traveling mode. It is assumed that the driver stepson the accelerator pedal at a substantially constant pace from the time point t21. In this case, as illustrated in FIG. 8, the AP opening degree in the vehicle 1 increases at a substantially constant increase rate from the time point t21. Therefore, the engine control unit 131 increases the engine rotational speed up to a time point t22 after the time point t21 at a substantially constant increase rate a21 corresponding to the increase in the AP opening degree. Incidentally, although not illustrated, at this time, the vehicle speed also increases (that is, accelerates) at a substantially constant increase rate as the engine rotational speed increases at the increase rate a21.

At the time point 122, it is assumed that the transition condition from the high-speed side engine traveling mode to the low-speed side engine traveling mode is satisfied. Here, the engine rotational speed at the time point t22 is set to Ne21 [rpm]. In this case, first, at the time point t22, the control device 100 controls the second clutch CL2 that has been engaged in the high-speed side engine traveling mode to be disengaged, thereby shifting to the hybrid traveling mode.

Further, upon transition to the hybrid traveling mode, the control device 100 increases the engine rotational speed to Ne22 [rpm]. Here, Ne22 [rpm] is greater than Ne21 [rpm] and smaller than Ne23 [rpm] described later. More specifically, Ne22 [rpm] is, for example, substantially the average of Ne21 [rpm] and Ne23 [rpm].

Thereafter, the control device 100 causes the vehicle 1 to travel in the hybrid traveling mode from the time point t22 until a time point t23 when a predetermined time elapses, for example. When the vehicle 1 is traveling in the hybrid traveling mode, the control device 100 increases the engine rotational speed at a substantially constant increase rate a22 corresponding to the increase in the AP opening degree, as illustrated in FIG. 8. Here, the increase rate a22 is greater than the increase rate a21 and smaller than an increase rate a23 described later, for example.

Thereafter, at the time point t23, the control device 100 causes the first clutch CL1 that has been disengaged in the hybrid traveling mode to be engaged, thereby shifting to the low-speed side engine traveling mode. As a result, the engine ENG and the driving wheel DW are mechanically connected, and accordingly, as illustrated in FIG. 8, the engine rotational speed increases to Ne23 [rpm] according to the vehicle speed at that time.

Then, after shifting to the low-speed side engine traveling mode, as illustrated in FIG. 8, the control device 100 increases the engine rotational speed at the substantially constant increase rate a23 corresponding to the increase in the AP opening degree. Although not illustrated, at this time, the vehicle speed also increases (that is, accelerates) at a substantially constant increase rate as the engine rotational speed increases at the increase rate a23.

As described above, when the transition condition from the high-speed side engine traveling mode to the low-speed side engine traveling mode is satisfied, the control device 100 performs a series of transitions of traveling modes (hereinafter also simply referred to as "shift") from the high-speed side engine traveling mode to the low-speed side engine traveling mode via the hybrid traveling mode.

The control device 100 controls, at the time of the above shift, the engine rotational speed (for example, Ne22 described above) in the hybrid traveling mode to be a value between the engine rotational speed (for example, Ne21 described above) at the time of transition from the high-speed side engine traveling mode to the hybrid traveling mode and the engine rotational speed (for example, Ne23 described above) at the time of transition from the hybrid traveling mode to the low-speed side engine traveling mode.

Specifically, the engine control unit 131 includes a derivation unit 133 (see FIG. 4). At the time of the above transition, the derivation unit 133 derives the engine rotational speed at the time of transition from the hybrid traveling mode to the low-speed side engine traveling mode based on the engine rotational speed at the time of transition from the high-speed side engine traveling mode to the hybrid traveling mode, the traveling state of the vehicle 1 and the reduction ratio of the low-speed side power transmission path.

More specifically, as illustrated in FIG. 8, when the AP opening degree increases at the substantially constant increase rate, the vehicle 1 is controlled to accelerate at a substantially constant acceleration. Therefore, based on the vehicle speed at the time point t22 and a predetermined time length from the time point t22 to the time point t23, the derivation unit 133 can predict the vehicle speed at the time point t23. Then, the derivation unit 133 can derive Ne23 [rpm], which is the engine rotational speed when the traveling mode is shifted to the low-speed side engine traveling mode at the time point t23, based on the predicted vehicle speed at the time point t23 and the reduction ratio of the low-speed side power transmission path.

As a result, at the time of the above transition, the engine control unit 131 can control the engine rotational speed in the hybrid traveling mode to be the value between the engine rotational speed at the time of transition from the high-speed side engine traveling mode to the hybrid traveling mode and the engine rotational speed at the time of transition from the hybrid traveling mode to the low-speed side engine traveling mode.

The control device 100 can roughly predict the increase rate a23 at the time point t22 based on the vehicle speed, the AP opening degree, the acceleration of the vehicle 1, and the like at the predicted time point t23. Therefore, when the vehicle is traveling in the hybrid traveling mode, the engine control unit 131 can increase the engine rotational speed at the increase rate a22 between the increase rate a21 and the increase rate a23 based on the predicted increase rate a23.

The present disclosure is not limited to the embodiments described above, and modifications, improvements, and the like can be made as appropriate.

At least the following matters are described in the present specification. Components and the like corresponding to the above-described embodiments are illustrated in parentheses, but the present disclosure is not limited thereto.

(1) A control device (control device 100) of a vehicle (vehicle 1) capable of traveling according to a plurality of traveling modes,
  the vehicle including:
  an internal combustion engine (engine ENG);
  a generator (generator GEN) configured to generate power by power of the internal combustion engine;
  an electric motor (motor MOT) configured to output power in accordance with the supplied electric power;
  a driving wheel (driving wheel DW) driven by power output from at least one of the internal combustion engine and the electric motor; and
  a disconnection/connection part (first clutch CL1) configured to disconnect/connect a power transmission path between the internal combustion engine and the driving wheel,
  the plurality of traveling modes including:
  a first traveling mode (hybrid traveling mode) in which the disconnection/connection part is disconnected, and the driving wheel is driven by the power output from the electric motor in accordance with at least the electric power supplied from the generator to cause the vehicle to travel; and
  a second traveling mode (low-speed side engine traveling mode) in which the disconnection/connection part is connected, and the driving wheel is driven by at least the power of the internal combustion engine to cause the vehicle to travel,
  the control device including:
  a traveling mode setting unit (traveling mode setting unit 120) configured to set the traveling mode of any one of the plurality of traveling modes; and
  an internal combustion engine control unit (engine control unit 131) configured to control the internal combustion engine,
  wherein the internal combustion engine control unit is configured to, in a case where the traveling mode setting unit sets the first traveling mode, increase a rotational speed of the internal combustion engine in accordance with an increase in a vehicle speed, and when the rotational speed reaches a predetermined first rotational speed (upper limit rotational speed NeH), decrease the rotational speed to a second rotational speed (lower limit rotational speed NeL) lower than the first rotational speed, and
  in which in a case where the internal combustion engine control unit decreases the rotational speed of the internal combustion engine to the second rotational speed, the traveling mode setting unit prohibits a transition to the second traveling mode for a predetermined period (Td) from when the rotational speed is decreased to the second rotational speed.

According to (1), in a case where the rotational speed of the internal combustion engine is decreased to the second rotational speed in the first traveling mode, the transition to the second traveling mode is forbidden for the predetermined period from when the rotational speed is decreased to the second rotational speed, so that it is possible to prevent a change in the rotational speed of the internal combustion engine that is not intended by the driver from being generated a plurality of times within a short period of time.

(2) The control device of a vehicle according to (1).
  in which in a case where a transition condition to the second traveling mode is satisfied based on a traveling state of the vehicle in the predetermined period, the traveling mode setting unit shifts the traveling mode to the second traveling mode at the end of the predetermined period.

According to (2), in a case where the transition condition to the second traveling mode is satisfied based on the traveling state of the vehicle in the predetermined period in which the transition to the second traveling mode is forbidden, the traveling mode is shifted to the second traveling mode at the end of the predetermined period, so that the vehicle can be efficiently driven by the second traveling mode suitable for the traveling state of the vehicle after the predetermined period ends.

What is claimed is:

1. A control device of a vehicle capable of traveling according to a plurality of traveling modes,
  the vehicle including:
    an internal combustion engine;
    a generator configured to generate electric power by power of the internal combustion engine;
    an electric motor configured to output power in accordance with the supplied electric power;
    a driving wheel driven by power output from at least one of the internal combustion engine and the electric motor; and
    a disconnection/connection part configured to disconnect/connect a power transmission path between the internal combustion engine and the driving wheel,
  the plurality of traveling modes including:
    a first traveling mode in which the disconnection/connection part is disconnected, and the driving wheel is driven by the power output from the electric motor in accordance with at least the electric power supplied from the generator to cause the vehicle to travel; and
    a second traveling mode in which the disconnection/connection part is connected, and the driving wheel is driven by at least the power of the internal combustion engine to cause the vehicle to travel,
  the control device comprising:
    a traveling mode setting unit configured to set the traveling mode of any one of the plurality of traveling modes; and
    an internal combustion engine control unit configured to control the internal combustion engine,
  wherein the internal combustion engine control unit is configured to, in a case where the traveling mode setting unit sets the first traveling mode, increase a rotational speed of the internal combustion engine in accordance with an increase in a speed of the vehicle, and when the rotational speed reaches a predetermined first rotational speed, decrease the rotational speed to a second rotational speed lower than the first rotational speed, and wherein in a case where the internal combustion engine control unit decreases the rotational speed of the internal combustion engine to the second rotational speed, the traveling mode setting unit is configured to forbid a transition to the second traveling mode for a predetermined period from when the rotational speed is decreased to the second rotational speed.

2. The control device of a vehicle according to claim 1, wherein in a case where a transition condition to the second traveling mode is satisfied based on a traveling state of the vehicle in the predetermined period, the traveling mode setting unit is configured to shift the traveling mode to the second traveling mode at the end of the predetermined period.

* * * * *